(12) United States Patent
Webb et al.

(10) Patent No.: US 10,699,606 B2
(45) Date of Patent: Jun. 30, 2020

(54) METHOD AND APPARATUS USING A COMBINATION OF QUANTUM DOT-CONTAINING FILMS WITH OPTICAL FILTER FILMS FOR SIGNAGE AND ILLUMINATION APPLICATIONS

(71) Applicant: NANOCO TECHNOLOGIES, LTD., Manchester (GB)

(72) Inventors: David Webb, Manchester (GB); Mark Saunders, Manchester (GB); James Harris, Manchester (GB); Ross Mera-Pirttijarvi, Manchester (GB)

(73) Assignee: Nanoco Technologies Ltd., Manchester (GB)

( * ) Notice: Subject to any disclaimer, the term of this patent is extended or adjusted under 35 U.S.C. 154(b) by 105 days.

(21) Appl. No.: 15/592,775

(22) Filed: May 11, 2017

(65) Prior Publication Data
US 2017/0330492 A1 Nov. 16, 2017

Related U.S. Application Data

(60) Provisional application No. 62/334,954, filed on May 11, 2016.

(51) Int. Cl.
*F21V 9/00* (2018.01)
*G09F 13/04* (2006.01)
(Continued)

(52) U.S. Cl.
CPC ............ *G09F 13/04* (2013.01); *G02B 5/20* (2013.01); *G09F 13/22* (2013.01);
(Continued)

(58) Field of Classification Search
CPC .. G09F 13/04; G09F 13/22; G09F 2013/0459; G09F 2013/222; G02B 5/20;
(Continued)

(56) References Cited

U.S. PATENT DOCUMENTS 6,653,798 B2 * 11/2003 Guthrie .............. H05B 33/0821
362/227
2007/0240346 A1 * 10/2007 Li ........................... G09F 13/20
362/84
(Continued)

FOREIGN PATENT DOCUMENTS

JP         2001229723 A        8/2001

OTHER PUBLICATIONS

Coe-Sullivan, S., et al., (2013), "Quantum Dots for LED Downconversion in Display Applications", ESC Journal of Solid State Science and Technolgy, vol. 2 (2), pp. R3026-R3030.
(Continued)

*Primary Examiner* — Y M. Lee
(74) *Attorney, Agent, or Firm* — Blank Rome, LLP

(57) ABSTRACT

An illuminated sign comprises a source of blue light; a quantum dot-containing film that produces green light when illuminated by the source of blue light; and, a patterned blue cutoff filter in optical communication with the quantum dot-containing film configured to allow a mixture of excess blue light from the source of blue light and green light from the quantum dot-containing film to pass through the pattern. The mixture of blue light and green light produces a pseudo white light. The illuminated sign may thus comprise pseudo white letters and/or graphics on a luminous green background.

16 Claims, 3 Drawing Sheets

(51) Int. Cl.
*G02B 5/20* (2006.01)
*G09F 13/22* (2006.01)
(52) U.S. Cl.
CPC .................. *G02B 2207/101* (2013.01); *G09F 2013/0459* (2013.01); *G09F 2013/222* (2013.01)
(58) Field of Classification Search
CPC ...... G02B 2207/101; G02B 5/22; G02B 5/26; G02B 5/223; G02B 5/202
See application file for complete search history.

(56) References Cited

U.S. PATENT DOCUMENTS

| | | | | |
|---|---|---|---|---|
| 2010/0188613 | A1* | 7/2010 | Tsukahara | G02B 6/0023 362/257 |
| 2011/0209367 | A1 | 9/2011 | Li et al. | |
| 2013/0147401 | A1* | 6/2013 | Choi | G09F 13/04 362/231 |
| 2013/0335677 | A1* | 12/2013 | You | G02F 1/133609 349/65 |
| 2015/0137163 | A1* | 5/2015 | Harris | H01L 33/483 257/98 |
| 2015/0285982 | A1 | 10/2015 | Coe-Sullivan et al. | |
| 2015/0378216 | A1* | 12/2015 | Oh | G02F 1/133609 362/84 |
| 2016/0004124 | A1 | 1/2016 | Benoit et al. | |
| 2016/0204317 | A1* | 7/2016 | Li | F21V 13/14 362/293 |

OTHER PUBLICATIONS

Nanoco, Preliminaary results presentation (2015), http://www.nanocotechnologies.com/system/files/uploads/financialdocs/Preliminary-Results-Presentation-13oct15_0.pdf.

* cited by examiner

METHOD AND APPARATUS USING A COMBINATION OF QUANTUM DOT-CONTAINING FILMS WITH OPTICAL FILTER FILMS FOR SIGNAGE AND ILLUMINATION APPLICATIONS

CROSS-REFERENCE TO RELATED APPLICATIONS

This application claims the benefit of U.S. Provisional Patent Application No. 62/334,954 filed on May 11, 2016, the contents of which are hereby incorporated by reference in their entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to lighting and illuminated devices. More particularly, it relates to illuminated devices having a source of primary light and a source of secondary light that comprises quantum dots which exhibit photoluminescence in response to excitation by the primary light.

2. Description of the Related Art Including Information Disclosed Under 37 CFR 1.97 and 1.98

A commonly encountered example of an illuminated device is an exit sign. Typically, exit signs of the prior art use an opaque green mask over a white backlight to generate the green and white areas. The green area relies on reflected light—i.e., it is not itself luminescent—which may result in poor green luminance and a sign that looks dull and must rely upon external lighting for full visibility.

Other versions exist wherein the green area is generated by filtering a white light using a green color filter but typically these signs are of lower efficiency because they not only filter blue light but also yellow, orange, and red light from the white light source. The disadvantage in this case is one of efficiency.

In yet other versions, the green areas of the sign are generated by green light emitting diodes (LEDs) and the white areas by white LEDs. Although efficient (because no light is lost by color filtering), this arrangement has the disadvantage of complexity inasmuch as it uses multiple types of LEDs that require different circuits and electrical driving conditions. Moreover, different types of LEDs are known to age at different rates. Hence, the relative luminance of the different colored areas of the sign may change over time.

Quantum dot-containing films can be used to color convert blue light or ultraviolet light from a low-power, high-efficiency light source to light of longer wavelength(s). However, full color conversion, i.e. 100% of the excitation source being absorbed and converted to a secondary color(s), comes at the expense of efficiency and increased material usage.

In applications wherein multiple colors are required, either different quantum dots (QDs) exhibiting emission at different wavelengths are needed, or a color filter may be used to remove the unwanted light. An example of such an application is an emergency exit sign. In this application, the main body of the sign is required to be green whereas the word EXIT, a graphic in the shape of a portal with a person running through it, and an arrow indicating the direction of the exit are required to be white. An example of such an exit sign in shown in FIG. 1.

BRIEF SUMMARY OF THE INVENTION

It has been found that, in fabricating a green and white sign for example, it is more economical and more efficient to partially color convert a blue backlight using quantum dots (e.g., in the form of a quantum dot-containing film) and filter the excess blue light using a simple absorption cutoff filter to create the saturated green areas of the sign. Generation of the white areas is more challenging. However, if the concentration of the green QDs in the quantum dot-containing sheet or film is selected such that a perceived "pseudo white" light is generated, this pseudo white light may be used to illuminate the entire face of the sign and the white letters and graphics may be cut into the blue cutoff filter resulting in white areas (pseudo white) in the areas where no light filtration is taking place and saturated green in the areas where light filtration is taking place.

BRIEF DESCRIPTION OF THE SEVERAL VIEWS OF THE DRAWING(S)

Figure 1:
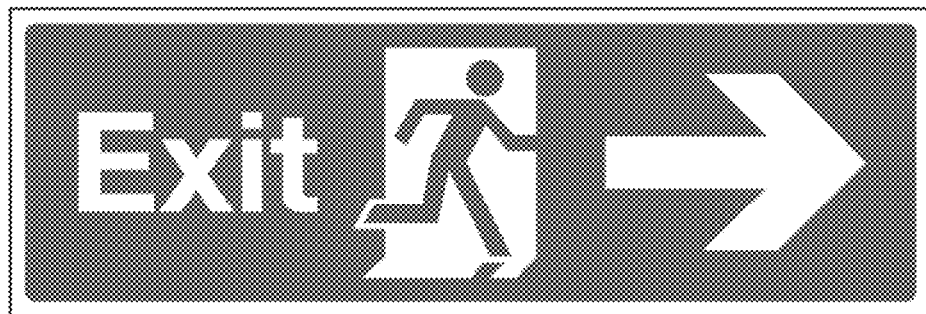
FIG. 1 is an illuminated EXIT sign having both green and white portions.
Figure 2:
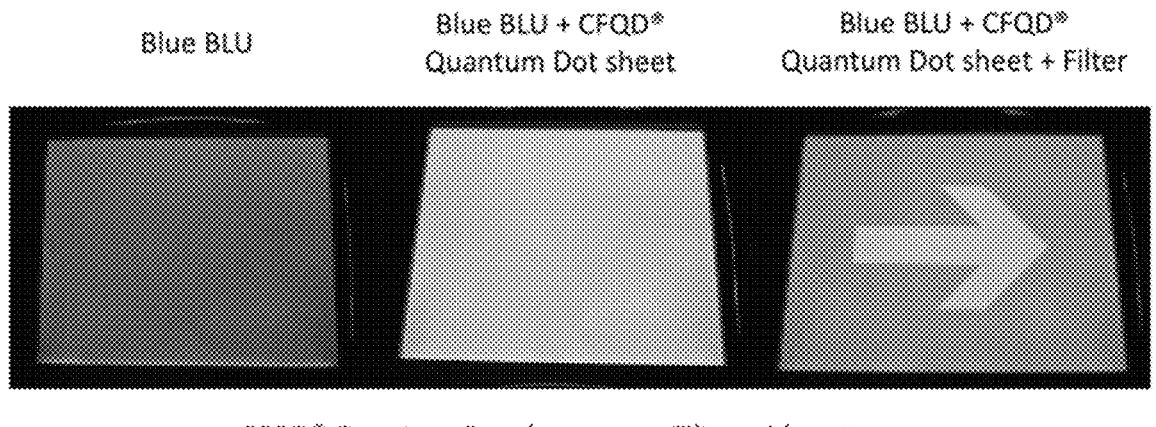
FIG. 2 are photographs of a blue backlight unit (BLU), a blue BLU with a quantum-dot sheet or film, a blue BLU with a quantum-dot sheet or film with an overlying cutoff filter having an arrow-shaped cut out, a quantum dot-containing sheet or film, and a cutoff filter having an arrow-shaped cut out.
Figure 2:
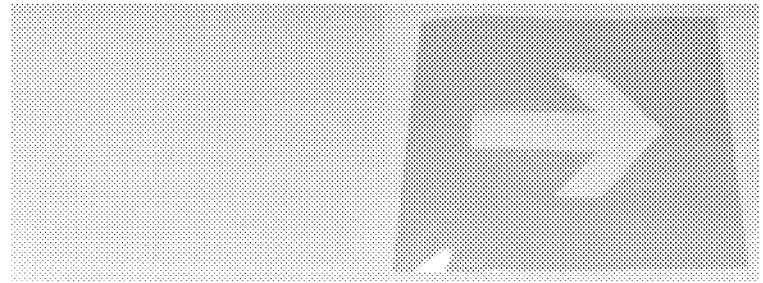
Figure 3:
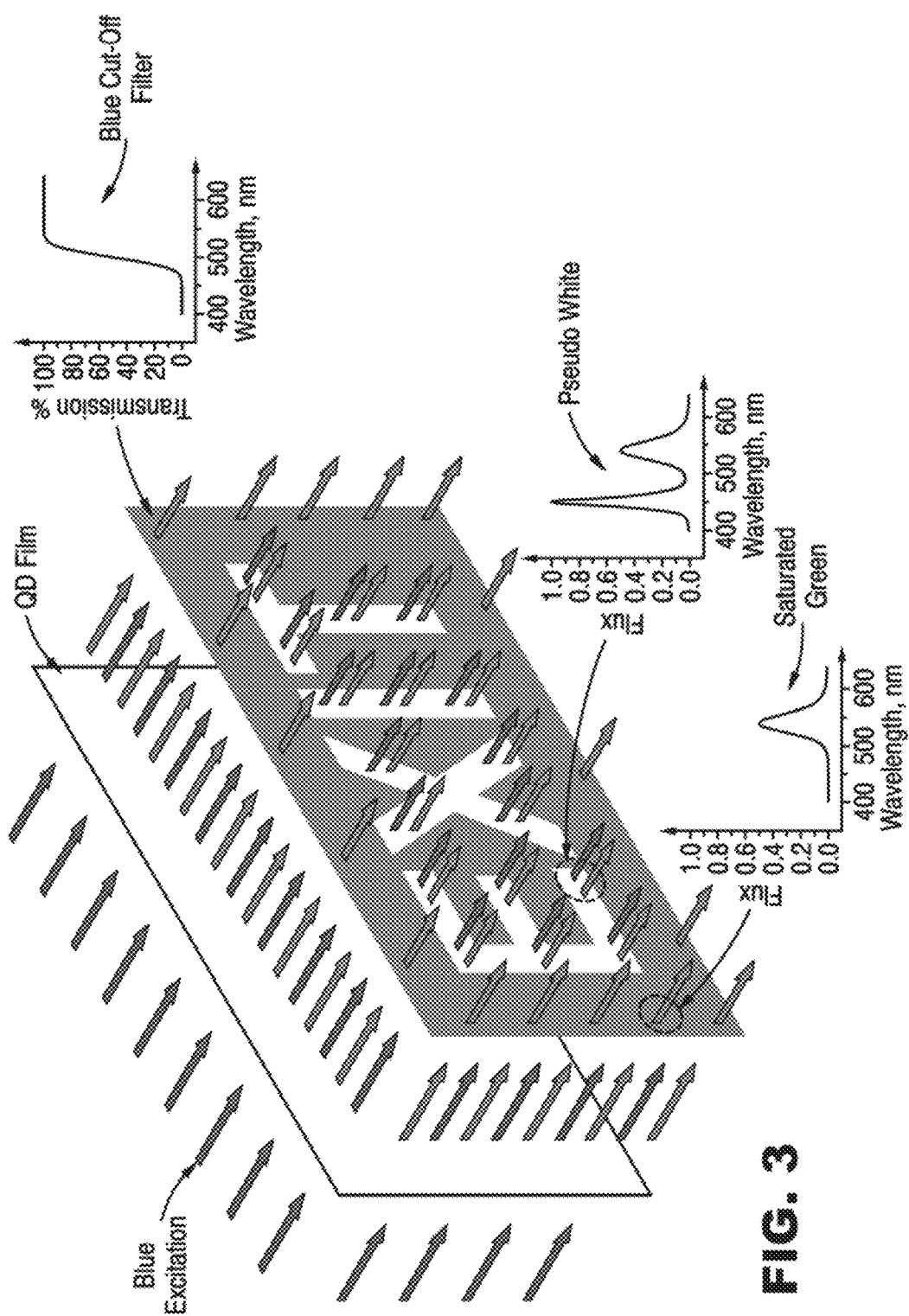
FIG. 3 is an exploded, perspective view of an exemplary exit sign embodiment of the invention wherein the word EXIT is displayed in a pseudo white light comprised of a mixture of green and blue light on a luminous green background. Also depicted in FIG. 3 are spectra of the green light and pseudo white light together with the spectral response curve of the blue cutoff filter.
Figure 4:
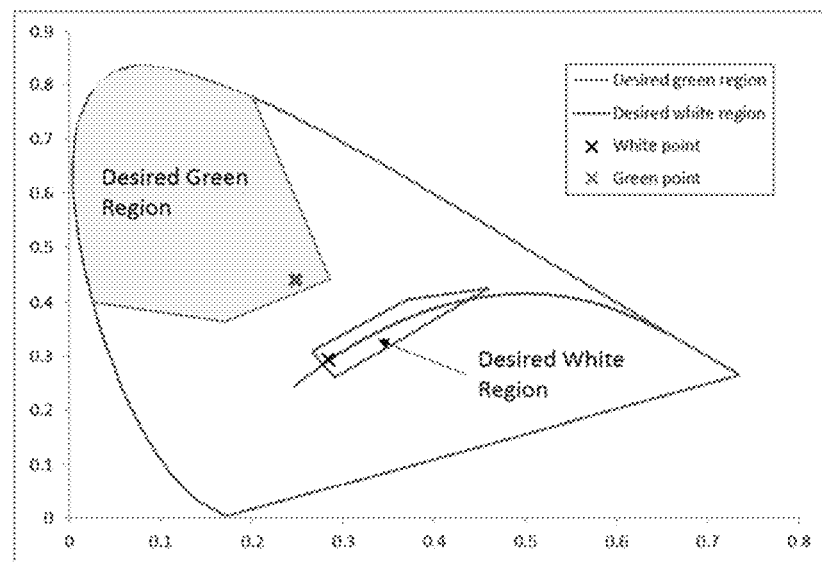

FIG. 4 is a CIE 1931 color space chromaticity diagram depicting the acceptable loci for "green" and "white" areas of an EXIT sign that is compliant with the color region specifications of regulation BS ISO 3864-4:2011 (Graphical Symbols—Safety Colors and Safety Signs). Also shown in FIG. 4 are the white and green color points achieved by one particular embodiment of the invention. The red curve depicted in FIG. 4 is the Planckian locus—the path that the color of a black body takes as the blackbody temperature changes.

Figure 5:
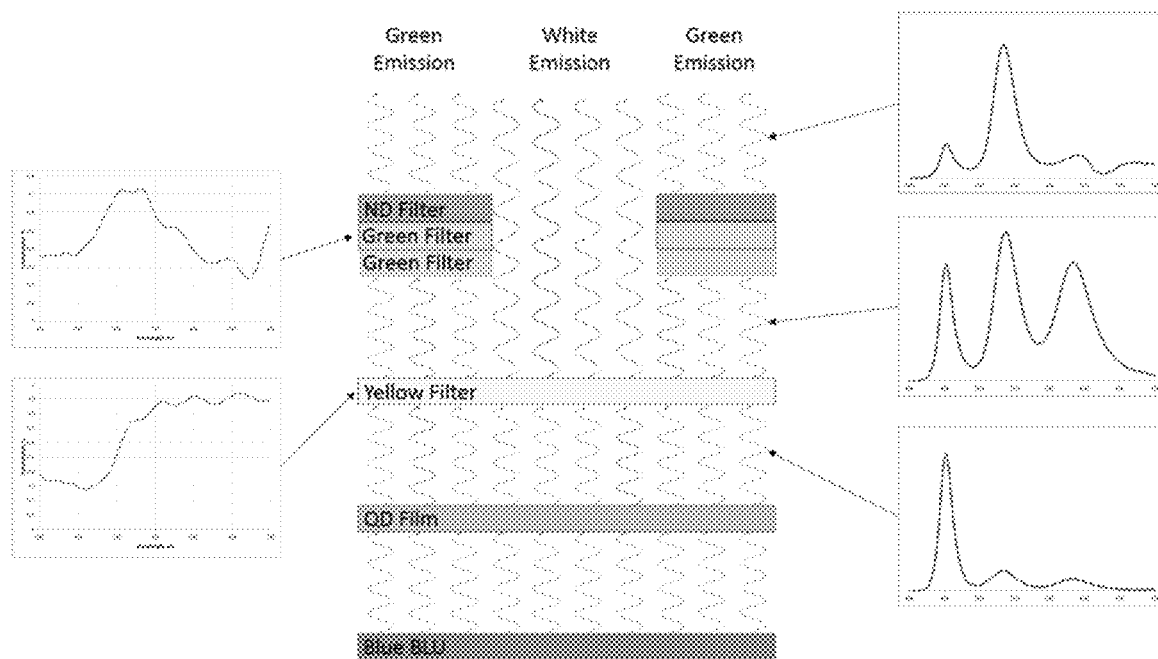

FIG. 5 is a schematic diagram of one particular green-and-white illuminated EXIT sign according to one embodiment of the invention, together with emission spectra at each layer in the film stack and transmission spectra of the filters used.

DETAILED DESCRIPTION OF THE INVENTION

In one particular exemplary embodiment of the invention, a QD-film and a blue cut-off filter are used in combination to produce an efficient, economical and simple illuminated sign. Prudent color rendering allows the production of an appropriate backlight color which, when filtered, produces light of the correct hue and saturation to match a desired color in one area of the sign whilst delivering desired light of the correct hue and saturation in another part of the sign.

In order to describe the invention, the remainder of this disclosure employs the example of an exit sign, but the invention may be extended to other types of signage as well as other illuminated devices and illumination means. The exemplary sign comprises a simple, blue, 450-nm backlight on top of which is positioned a green-fluorescing QD-containing film which is loaded with green QDs at a concentration such that, when the QDs luminescence and the residual blue light (blue light from the backlight that is not absorbed by the QD-containing film) combine, they produce a pseudo white light. As used herein, "pseudo white" refers to light that consists primarily of blue and green light and little or no red light. It has been found that such pseudo white light is perceived by the human eye as white especially when viewed next to a saturated color such as that in the color-filtered portions of the exemplary exit sign.

The next film in the exemplary stack is a blue cut-off filter. This film is selected to have a transmittance such that light having a wavelength longer than about 500 nm is allowed to pass but blue light is absorbed or reflected back into the stack. Shapes (letters, directional arrows, other such graphics etc.) may be cut into this film or similarly shaped clear portions provided in the film.

When viewed from the front, those areas where the stack is complete, i.e. blue backlight/QD-containing film/filter, is observed by a viewer as saturated green light from the QD luminescence because the excess blue light i.e. the blue light that passes unconverted through the QD-containing film is absorbed (or reflected) by the filter. In areas where there is a hole (or clear portion) in the filter and the stack is not complete, i.e. blue/QD-containing film only, the viewer will observe a mixture of blue light and QD luminescence which in this case produces a pseudo white light.

The above-described viewer experience is illustrated schematically in FIG. 5. Although two stacked green filters are shown in the exemplary device of FIG. 5, it will be appreciated that any number of color filters may be employed. Blue light from the backlight unit (BLU) is directed towards the QD-containing film wherein the quantum dots are excited by the blue light and emit green light in response. The green light emitted by the quantum dots combines with unabsorbed blue light passing through the QD-containing film as shown in the lower spectrum on the right side of FIG. 5. The yellow filter (having the transmission spectrum shown in the lower panel on the left side of FIG. 5) selectively attenuates the blue light to produce the spectrum shown in the middle panel on the right side of FIG. 5. This is perceived by the viewer as white light—i.e. in the "desired white region" indicated in the diagram of FIG. 4. As may be seen in the emission spectra on the right side of FIG. 5, some emission in the red portion of the spectrum may be required in order to obtain the desired white point. This may be accomplished by including a selected concentration of red-emitting quantum dots and/or a red-emitting phosphor in the color-containing film. An example of a suitable red-emitting phosphor is $K_2SiF_6:Mn^{4+}$ (KSF). One or more green filters cut in a desired pattern (or with clear areas in that pattern) and having the transmission spectrum shown in the upper panel on the right side of FIG. 5 produce green light in selected areas of the sign. A neutral-density (ND) filter may be included in selected areas to balance the luminance in the green areas of the sign with the luminance in the white areas of the sign. In an embodiment, the ND filter may be incorporated into the color filter.

As illustrated in FIG. 4, the white color required for an exit sign may necessitate the use of some red-emitting quantum dots and/or a red-emitting phosphor such as KSF in the sheet or film in addition to the green-emitting quantum dots.

An iterative process of color rendering may be used for selecting the types and loading of the QDs in the film. This process may basically comprise a "feedback loop" consisting of making a film with a first guess of loading, placing it onto a blue backlight, measuring the color point, deciding if more or less quantum dot luminescence is needed to balance the color with the transmitted blue light and the quantum dot emission, adjusting the loading of quantum dots in the resin that is subsequently processed into a new film, measuring the color produced and repeating the process until the desired target color is obtained.

The light produced may depend to an extent on the wavelength of the primary source, but may also depend on resin formulation, quantum dot photoluminescence wavelength, and of the photoluminescence quantum yield (PLQY) of the quantum dots.

In yet other embodiments, the separate light filtering film may be eliminated by incorporating the light-filtering element directly onto the QD-containing film by, for example, a printing method that selectively deposits absorptive dyes in areas where light filtration is required.

In the exemplary form of an exit sign, it will be appreciated that the advantages of the invention include a simpler device structure with enhanced efficiency. In the form of other signs or implementations of the invention, the advantages expand to the precise control of color of the QD-containing film (via color rendering) which when combined with correct filtering provides an expanded color gamut for signage applications without the loss of efficiency usually associated with light filtering.

It will be appreciated that the pseudo white light produced by certain embodiments of the present invention may be used to provide other forms of illumination such as general area lighting or spot lighting (by way of example only). A representative device for such an application may comprise a source of blue light such as a blue-emitting LED, and a quantum dot-containing sheet or film with QDs that fluoresce in the green portion of the spectrum in response to photoexcitation by blue light, wherein the device is configured such that a portion of the blue light from the blue-emitting LED passes through the QD-containing sheet or film and blends with the green light emitted by the quantum dots. Such a device may have particular application in nightlights, stair tread illumination and other such low-light applications.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. An illuminated sign comprising:
   a source of blue light;
   a quantum dot-containing film that, when illuminated by the source of blue light, produces solely green light and passes a portion of the blue light therethrough; and
   a blue cutoff filter having one or more openings for the transmission of light therethrough, the blue cutoff filter in optical communication with the quantum dot-containing film and configured to allow:
   a mixture of excess blue light from the source of blue light and green light from the quantum dot-containing film to pass through the one or more openings of the blue cutoff filter; and
   green light to pass through portions of the blue cutoff filter that are not the one or more openings.

2. The illuminated sign recited in claim 1 wherein the source of blue light is a plurality of blue-emitting light emitting diodes [LEDs].

3. The illuminated sign recited in claim 1 wherein the quantum dot-containing film comprises heavy metal-free quantum dots.

4. The illuminated sign recited in claim 1 wherein the one or more openings in the blue cutoff filter comprises one or more selectively deposited absorptive dyes on a transparent film.

5. The illuminated sign recited in claim 1, further comprising a yellow filter disposed between the quantum dot-containing film and the blue cutoff filter.

6. The illuminated sign recited in claim 5, further comprising a neutral-density filter disposed on portions of the blue cutoff filter that do not comprise the openings.

7. An illuminated sign comprising:
   a source of blue light;
   a quantum dot-containing film that produces green light and red light when illuminated by the source of blue light; and
   a blue cutoff filter having one or more openings for the transmission of light therethrough, the blue cutoff filter in optical communication with the quantum dot-containing film and configured to allow:
   a mixture of excess blue light from the source of blue light and green light together with red light from the quantum dot-containing film to pass through the one or more openings of the blue cutoff filter; and
   green light and red light to pass through portions of the blue cutoff filter that are not the one or more openings.

8. The illuminated sign recited in claim 7 wherein the red light in the quantum dot-containing film is produced by red-emitting quantum dots in the film.

9. The illuminated sign recited in claim 7 wherein the red light in the quantum dot-containing film is produced by a red-emitting phosphor.

10. The illuminated sign recited in claim 9 wherein the red-emitting phosphor is $K_2SiF_6:Mn^{4+}$ (KSF).

11. The illuminated sign recited in claim 7 wherein the source of blue light is a plurality of blue-emitting light emitting diodes [LEDs].

12. The illuminated sign recited in claim 7 wherein the quantum dot-containing film comprises heavy metal-free quantum dots.

13. The illuminated sign recited in claim 7 wherein the one or more openings in the blue cutoff filter comprises one or more selectively deposited absorptive dyes on a transparent film.

14. The illuminated sign recited in claim 7 wherein the mixture of excess blue light from the source of blue light and green light together with red light from the quantum dot-containing film is a pseudo white light.

15. The illuminated sign recited in claim 7, further comprising a yellow filter disposed between the quantum dot-containing film and the blue cutoff filter.

16. The illuminated sign recited in claim 15, further comprising a neutral-density filter disposed on portions of the blue cutoff filter that do not comprise the openings.

* * * * *